Figure 9:
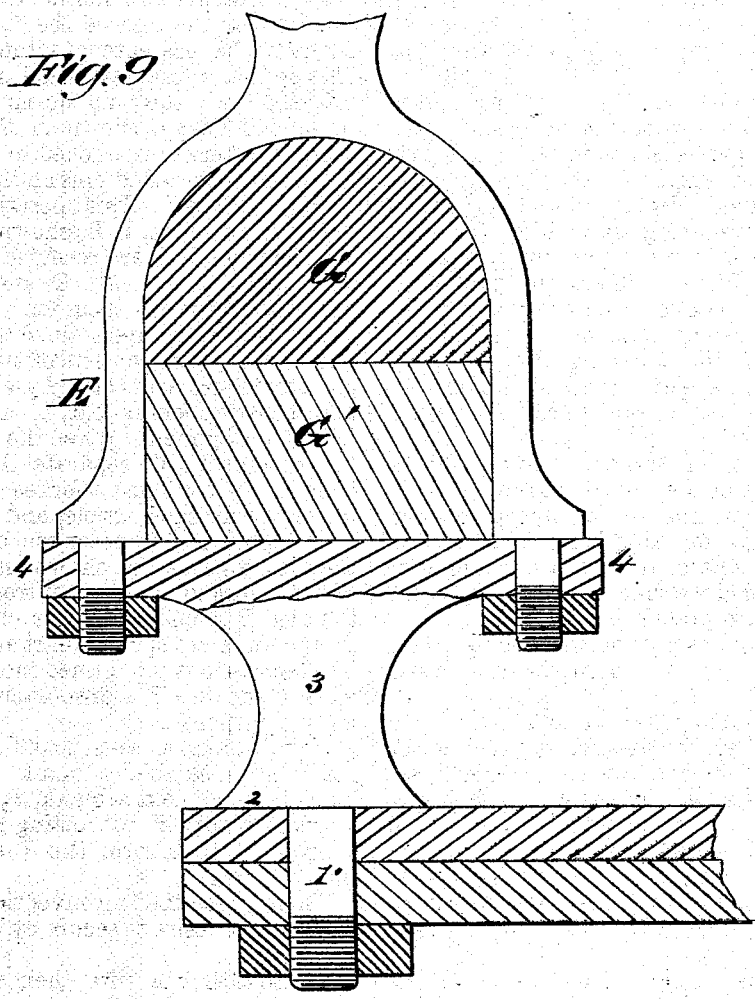

2 Sheets--Sheet 1.
A. DILLENBECK.
Dies for Making Clips for King-Bolts.
No. 136,143. Patented Feb. 25, 1873.
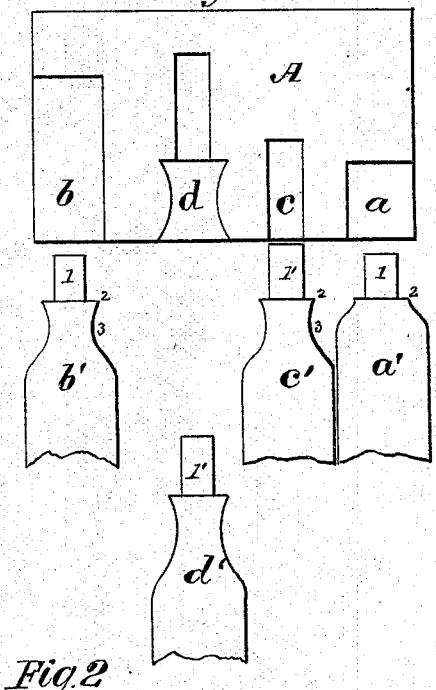
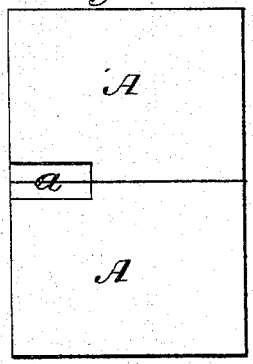
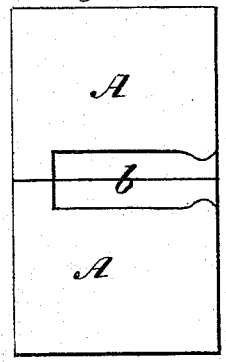
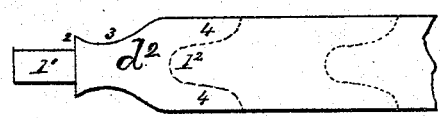
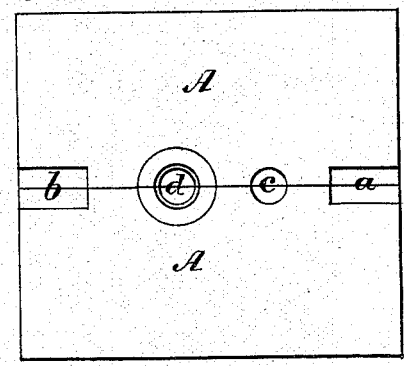
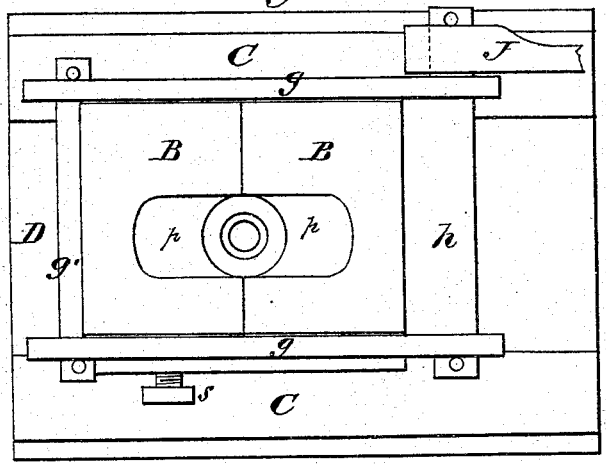
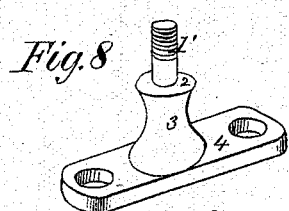
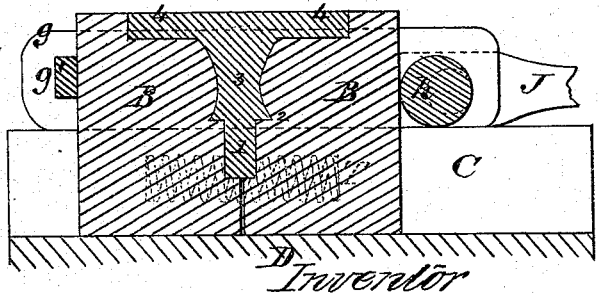
Witnesses. R. T. Campbell
Inventor
Ambrose Dillenbeck
by Mason, Fenwick & Lawrence 2 Sheets--Sheet 2.

A. DILLENBECK.
Dies for Making Clips for King-Bolts.

No. 136,143. Patented Feb. 25, 1873.

Witnesses
Inventor

UNITED STATES PATENT OFFICE.

AMBROSE DILLENBECK, OF FORT PLAIN, NEW YORK.

IMPROVEMENT IN DIES FOR MAKING CLIPS FOR KING-BOLTS.

Specification forming part of Letters Patent No. 136,143, dated February 25, 1873.

*To all whom it may concern:*

Be it known that I, AMBROSE DILLENBECK, of Fort Plain, in the county of Montgomery and State of New York, have invented a new and Improved Method of Producing Clips for King-Bolts; and I do hereby declare that the following is a full, clear, and exact description thereof, reference being had to the accompanying drawing making part of this specification, in which—

Figure 1, Plate 1, is a view of the bottom one of two dies for preparing the blanks ready for the finishing-dies, showing also the blanks in the different stages as they are operated on by such dies. Fig. 2, Plate 1, is a front view of the preparing-dies. Figs. 3 and 4, Plate 1, are end views of the two preparing-dies. Fig. 5, Plate 1, shows the manner of cutting off the blanks preparatory to forming the T-shaped heads on them. Figs. 6 and 7, Plate 1, show the finishing-dies. Fig. 8, Plate 1, is a perspective view of the finished clip. Fig. 9, Plate 2, is a sectional view of the clip applied.

Similar letters of reference indicate corresponding parts in the several figures.

This invention has for its object the production of clips for king-bolts by means of dies, whereby these articles are made with much greater facility than is possible by hand-labor as hitherto practiced.

The following description will enable others skilled in the art to understand my invention.

In the accompanying drawing, Plate 1, I have represented the dies for producing the clips, and also a finished article; and on Plate 2 I have represented the article applied to a king-bolt; the axle-bed G', the bolster G, and the reach being shown in section.

Prior to my invention clips for king-bolts were made by hand-labor, and they were comparatively very expensive, and more or less imperfect.

I prepare the blanks by first reducing the end of a bar of iron of the proper size, as indicated in dotted lines, Fig. 5, and then forming out of the reduced end a square pin, 1, and a shoulder, 2. This is done between the depressed portions $a$ of two dies, A A, represented in Figs. 1, 2, and 3. The bar is then moved to the left-hand end of the dies A, and the concave pillar or standard 3 is formed in the depressions $b$ by turning the bar at every drop of the hammer. The square pin 1 is then rounded in the circular depressions $c$ of dies A, so as to form the pin 1', on which a screw-thread is subsequently cut. The bar is then adjusted in the recesses $d$ of the dies A, and the pillar 3 and its pin 1' are finished. The bar is then adjusted under a cutter, which severs from it a piece represented in Fig. 5, which presents two horns on one of its ends, and leaves the end of the bar reduced and ready to be presented to the dies A again. The next and final operation spreads out and flattens down the said horns and leaves the T-shaped head 4 shown in Figs. 7, 8, and 9, which is afterward punched to receive through it the screw-threaded pins on the clip E, shown in Fig. 9, Plate 2. This operation is conducted between two dies, B B, shown in Figs. 6 and 7. The dies B B are received between dovetail ways C C on a bed, D, and have springs T applied between them for separating them when they are unrestrained by a clamping-yoke. This yoke consists of two parallel bars, $g$ $g$, which are connected by a tie-bar, $g'$, and an eccentric rocking bar, $h$, on which latter a lever, J, is applied. When the lever J is raised the springs T will separate the dies B B far enough to introduce a forked blank or to remove the finished article, and when the lever J is depressed the eccentric bar $h$ will force the dies together, as shown in Figs. 6 and 7. When a forked blank is introduced between the dies B B and the latter closed on it, the forked ends are spread apart and driven down into depressions $p$ $p$ formed into the upper surfaces of the dies B, a drop-hammer being used for the purpose.

It will thus be seen that I first produce a blank, $a'$, in $a$; then a blank, $b'$, in $b$; then a blank, $c'$, in $c$; next a blank, $d^1$, in $d$; and then a forked blank, $d^2$, by cutting $d^1$ from the bar of iron. I then form the T-shaped head 4 shown in Fig. 7.

Having described my invention, what I claim as new, and desire to secure by Letters Patent, is—

1. The dies A A with their several depressions, $a$, $b$, $c$, and $d$, for producing the blank $d^1$, substantially as described.

2. The heading-dies B B, recessed, as described, for producing the head 4 on the pillar 3 from a forked blank, $d^2$, substantially as described.

AMBROSE DILLENBECK.

Witnesses:
F. FOX WENDELL,
E. A. DILLENBECK.